Dec. 31, 1929.  E. H. COWAN  1,742,136

WEAR COMPENSATING PISTON

Filed Dec. 20, 1928

Inventor
E. H. Cowan

By Clarence A. O'Brien
Attorney

Patented Dec. 31, 1929

1,742,136

UNITED STATES PATENT OFFICE

EDGAR H. COWAN, OF MARION, OHIO

WEAR-COMPENSATING PISTON

Application filed December 20, 1928. Serial No. 327,326.

This invention relates to an improved piston such as is used in explosive engines, particularly of the type employed in the construction of motor vehicles, and it has more particular reference to an improvement wherein the novelty is predicated upon a distinctive structural means designed for taking up wear between a piston pin and the portions connecting the pin with the body of the piston.

Briefly described, the invention comprises a hollow cylindrical piston body having diametrically opposite inwardly extending tapered bearings, together with radially adjustable tapered bushings mounted therein and adjusted through the medium of retaining nuts having abutting contacts with the inner end of said bearing.

The particular features which cooperate in producing this improved structure will become more readily apparent from the following description and drawings.

Figure 1:
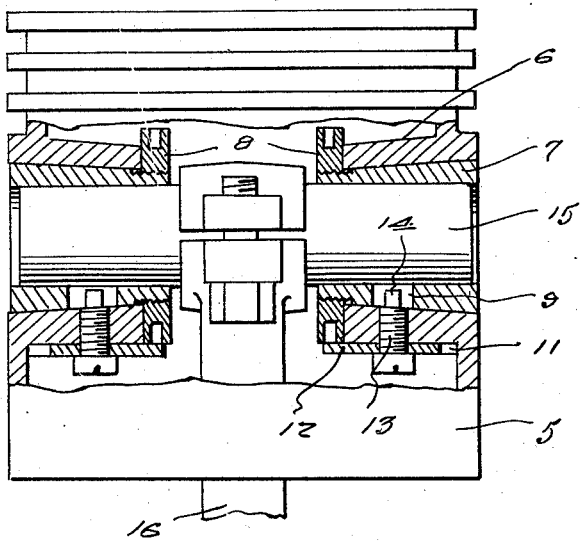
Figure 1 is a view in section and elevation showing the complete piston and the means for attaching the piston pin thereto.
Figure 2:
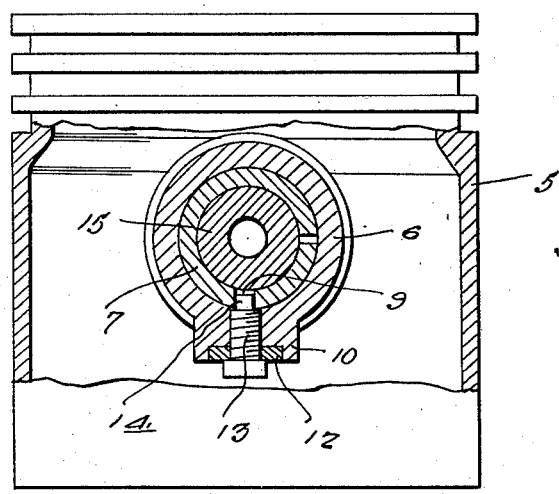
Figure 2 is a fragmentary sectional and elevational view through one of the bearing assembly.
Figure 3:
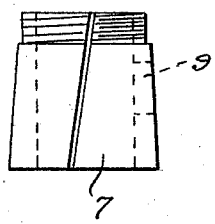
Figure 3 is an elevational view of the split tapered bushing.
Figure 4:
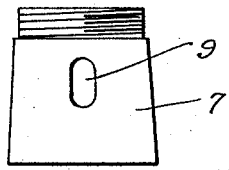
Figure 4 is also a view of the bushing showing a keeper slot formed in one side thereof.

In the drawings the piston is designated by the reference character 5. It comprises a hollow cylindrical shell having diametrically opposite inwardly extending cast bearings 6 of inwardly tapered cross sections. This bearing together with the parts associated therewith is distinguished as a bearing assembly. Each assembly is the same and a description of one will suffice for both. Proceeding in accordance with this suggestion, it will be observed that the tapered bushing or sleeve 7 fits within the main bearing support 6 and has an inner screw threaded end extending beyond the corresponding end of the part 6. A retaining nut 8 is threaded on this end and has abutting contacts with the inner end of the part 6, whereby to permit the bushing to be drawn inwardly from time to time to take up wear. The bushing is longitudinally slit as shown in Figure 3 to allow for contraction. Moreover it is formed in one side and intermediate its ends with a slot 9 which functions as a keeper or keyway. Referring to Figure 2 it will be observed that the lower portions of the part 6 is thickened as at 10 and formed in its bottom with a groove 11 in which a clamping plate 12 is mounted. The plate extends outwardly beyond the inner end of the part 6 in order that it may cooperate in binding relation with the peripheral edge of the nut to hold the nut against accidental turning. This plate is held in place by a retaining screw 13 threaded through an opening in the portion 10 and having a reduced key 14 on its inner end extending into the keyway 9. Thus, the bushing is allowed to slide radially inward, but is prevented from turning, as the nut 8 is fed onto the screw threaded end through the use of a spanner wrench or the like. The piston pin, which is of ordinary construction and is designated by the reference character 15, has its end portion extending into the smooth internal bore of the bushing. Moreover, the connecting rod 16 is connected through the medium of an appropriate clamping head with the intermediate portion of the piston pin in the customary manner.

It is obvious that by turning the nut 8 against the end of the bearing 6, the bushing 7 will be fed inwardly and will be contracted circumferentially to take up wear from time to time, it will be seen that I have evolved to produce simple and inexpensive means for compensating for wear and for insuring proper alinement relationship between the connecting rod, piston pin, and the piston body.

A careful consideration of the drawings in connection with the description will enable the reader to obtain a clear understanding of the invention and its advantages, therefore, a more lengthy description is regarded unnecessary. Minor changes in shape, size, and rearrangement of details coming within the field of invention claimed may be resorted to in actual practice if desired.

Having thus described the invention, what

I claim as new and desire to secure by Letters Patent is:—

1. In a structure of the class described, in combination with a piston comprising a hollow cylindrical body having diametrically opposite inwardly extending and inwardly tapered bearings, of duplicate longitudinally slit bushings fitted in said bearings and tapered for cooperation with the tapered surfaces of the bearings, the inner ends of said bushings being screw threaded and extending beyond the corresponding ends of said bearings, adjusting nuts carried by said screw threaded ends and engageable with the inner ends of said bearings, said bushings being formed with longitudinal keeper slots, said bearings being formed with grooves, retaining plates fitted in said grooves, and retaining screws for said plates carried by the bearings and having reduced extensions on their ends extending into said keeper slots, the inner ends of said plates extending beyond the corresponding ends of said bearings and being engageable with the peripheral portions of the nuts to prevent accidental turning of the nuts.

2. In combination with a piston comprising a hollow body provided with a pair of diametrically inwardly extending and tapered bearings, of longitudinally split tapered bushings fitted in said bearings and having inner screw threaded ends extending beyond the bearings, adjusting nuts carried by the screw threaded ends and engageable with the inner ends of the bearing, means carried by said bearings for preventing turning of the bushings in the bearings, said bushings being adapted for sliding movement longitudinally of the bearings, each of said bushings adapted to receive the ends of a piston pin, and means carried by said bearings and engageable with said adjusting nuts to prevent casual turning of the nut.

In testimony whereof I affix my signature.

EDGAR H. COWAN.